US010625698B2

(12) United States Patent
Marcial-Simon (10) Patent No.: US 10,625,698 B2
(45) Date of Patent: Apr. 21, 2020

(54) DETERMINATION OF IDENTIFYING CHARACTERISTICS OF AN ACCIDENT PARTICIPANT IN THE EVENT OF AN ACCIDENT INVOLVING THE ACCIDENT PARTICIPANT AND A MOTOR VEHICLE

(71) Applicant: Bayerische Motoren Werke Aktiengesellschaft, Munich (DE)

(72) Inventor: Enrique Marcial-Simon, Veitshoechheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/373,288

(22) Filed: Apr. 2, 2019

(65) Prior Publication Data

US 2019/0225175 A1     Jul. 25, 2019

Related U.S. Application Data

(63) Continuation of application No. PCT/EP2017/074845, filed on Sep. 29, 2017.

(30) Foreign Application Priority Data

Oct. 5, 2016  (DE) .......................... 10 2016 219 252

(51) Int. Cl.
*B60R 21/015* (2006.01)
*G08G 1/04* (2006.01)
(Continued)

(52) U.S. Cl.
CPC .... *B60R 21/01512* (2014.10); *B60R 21/0136* (2013.01); *G07C 5/0866* (2013.01);
(Continued)

(58) Field of Classification Search
CPC ........... G08G 1/166; G08G 1/16; G08G 1/04; G08G 1/0175; G07C 5/085; G07C 5/008;
(Continued)

(56) References Cited

U.S. PATENT DOCUMENTS

| 9,007,455 B2 | 4/2015 | Lee | |
| 10,102,587 B1 * | 10/2018 | Potter | ..................... B60R 25/04 |
| 2015/0145695 A1 * | 5/2015 | Hyde | ..................... G08G 1/166 |
| | | | 340/905 |

FOREIGN PATENT DOCUMENTS

| DE | 102 50 952 A1 | 5/2004 |
| DE | 103 37 619 A1 | 3/2005 |

(Continued)

OTHER PUBLICATIONS

PCT/EP2017/074845, International Search Report dated Jan. 30, 2018 (Three (3) pages).
(Continued)

*Primary Examiner* — An T Nguyen
(74) *Attorney, Agent, or Firm* — Crowell & Moring LLP (57) ABSTRACT

The disclosure relates to determining an identifying characteristic of an accident participant in the event of an accident involving the accident participant and a motor vehicle. A time of the accident is determined using a contact sensor of the motor vehicle, where the contact sensor is configured to detect external contact with the motor vehicle. An environment of the motor vehicle is recorded after the determined time of the accident as accident data, where the environment is recorded based on recordings from a visual recording apparatus. The accident participant is determined based on the recorded accident data, and an identifying characteristic of the accident participant is determined based on the detected accident participant and the recorded accident data.

14 Claims, 9 Drawing Sheets

(51) Int. Cl.
*G08G 1/017* (2006.01)
*G07C 5/08* (2006.01)
*G08G 1/01* (2006.01)
*B60R 21/0136* (2006.01)
*B60R 21/00* (2006.01)

(52) U.S. Cl.
CPC ......... *G07C 5/0891* (2013.01); *G08G 1/0112* (2013.01); *G08G 1/0141* (2013.01); *G08G 1/0175* (2013.01); *G08G 1/04* (2013.01); *B60R 2021/0027* (2013.01)

(58) Field of Classification Search
CPC ...... G06Q 40/08; B60Q 2300/47; B60Q 1/24; B60Q 1/08
See application file for complete search history.

(56) References Cited

FOREIGN PATENT DOCUMENTS

| | | |
|---|---|---|
| DE | 10 2006 055 659 A1 | 5/2008 |
| DE | 10 2015 201 327 A1 | 7/2016 |
| DE | 10 2016 003 574 A1 | 9/2016 |
| EP | 2 830 023 A1 | 1/2015 |
| ES | 2 157 740 A1 | 8/2001 |
| GB | 2528477 A | 1/2016 |
| WO | WO 2016/103258 A1 | 6/2016 |

OTHER PUBLICATIONS

German Search Report issued in German counterpart application No. 10 2016 219 252.3 dated Aug. 2, 2017, with Statement of Relevancy (Twelve (12) pages).

* cited by examiner

DETERMINATION OF IDENTIFYING CHARACTERISTICS OF AN ACCIDENT PARTICIPANT IN THE EVENT OF AN ACCIDENT INVOLVING THE ACCIDENT PARTICIPANT AND A MOTOR VEHICLE

CROSS REFERENCE TO RELATED APPLICATIONS

This application is a continuation of PCT International Application No. PCT/EP2017/074845, filed Sep. 29, 2017, which claims priority under 35 U.S.C. § 119 from German Patent Application No. 10 2016 219 252.3, filed Oct. 5, 2016, the entire disclosures of which are herein expressly incorporated by reference.

BACKGROUND AND SUMMARY OF THE INVENTION

The present invention relates to the practice of monitoring a motor vehicle.

In order to clarify the cause of an accident or a liability issue in traffic situations, image materials can be used as an important source of information. In this case, vehicle cameras which can make a recording in the event of a detected vibration or acceleration already exist in the field.

However, only particular views of the environment can be recorded with the aid of cameras fitted to the vehicle. Areas which are arranged radially around the vehicle therefore cannot be captured. In addition, areas are often optically shielded from the vehicle by other objects. Since areas which are frequently distinguished, for example the front and rear with a license plate, are needed to identify other road users, however, the relevant road users cannot be uniquely identified in these cases.

Permanent recording of the vehicle environment could help in this case. However, this is not allowed in many countries for reasons of data protection. Furthermore, permanent recording of the vehicle environment requires large data memories.

Therefore, it would be desirable to provide a possible way of being able to uniquely identify an accident participant when required.

An object of the invention is to propose a possibility which avoids or at least reduces at least some of the disadvantages known in the prior art.

In this case, the subject matter of the main claim relates to a method for determining identifying characteristics of an accident participant in the event of an accident involving the accident participant and a motor vehicle. In this case, the method comprises: determining the time of an accident, wherein the time of the accident is determined using a contact sensor of the motor vehicle; in this case, the contact sensor is set up to detect external contact with the motor vehicle; recording an environment of the motor vehicle after the determined time of the accident as accident data, wherein the environment is recorded on the basis of recordings from a visual recording apparatus; determining the accident participant on the basis of the recorded accident data; and determining an identifying characteristic of the accident participant on the basis of the detected accident participant and the recorded accident data.

In this case, method steps can be carried out in an automated manner by means of a suitable automation apparatus.

An identifying characteristic in the sense of the invention may in this case be any characteristic of a corresponding object which allows the latter to be uniquely identified.

For example, if the object is a motor vehicle, the identifying characteristic may be the license plate number of the vehicle, for example. If the object is a person, the identifying characteristic may be the person's face, for example.

An accident participant in the sense of the invention may be an object which is involved in an accident with the corresponding motor vehicle. This may be a further vehicle and/or a person, for example.

A contact sensor in the sense of the invention here means a sensor of the motor vehicle which is able to determine contact with the motor vehicle which is so strong that it is suitable for causing damage to the motor vehicle. Such contact can therefore be triggered by a vibration or a brief acceleration of the motor vehicle.

An environment of the motor vehicle in the sense of the invention may be in this case the area around the motor vehicle. In this case, the environment of the motor vehicle may be defined by a distance from the motor vehicle which still allows the accident participant to be recorded and identified using a visual recording apparatus present at the boundary.

Accident data in the sense of the invention may here be information which arises during a recording by means of a visual recording apparatus. This information is preferably digitally stored as visually perceptible recordings of the accident participant and of the relevant accident environment of the motor vehicle.

A visual recording apparatus in the sense of the invention means in this case an apparatus which is set up to make visual recordings of the accident participant and of the relevant accident environment of the motor vehicle. These may be optical apparatuses, for example a video camera and/or an infrared camera.

Determining the accident participant in the sense of the invention means here that a corresponding object can be determined on the basis of the location at which contact is made with the motor vehicle, which object can be inferred to be an accident participant.

The teaching according to the invention achieves the advantage that an accident participant can be determined in an improved manner. Another advantage is that the improved determination of the accident participant can be carried out in an automated manner by means of automated evaluation of the recordings made. An accident participant can therefore be determined even when the user of the motor vehicle affected by an accident is currently not locally present at the accident situation.

Another advantage is that the accident participant is recorded only as required.

The subject matter of a coordinate claim relates in this case to an apparatus for determining identifying characteristics of an accident participant in the event of an accident involving the accident participant and a motor vehicle. In this case, the apparatus has: a first determination means for determining the time of an accident, wherein the time of the accident is determined using a contact sensor of the motor vehicle; in this case, the contact sensor is set up to detect external contact with the motor vehicle; a recording means for recording an environment of the motor vehicle after the determined time of the accident as accident data; in this case, the recording of the environment is based on recordings from a visual recording apparatus; a second determination means for determining the accident participant on the basis of the recorded accident data; and a third determination means for determining an identifying characteristic of the accident participant on the basis of the detected accident participant and the recorded accident data. In this case, the apparatus is set up to carry out any method according to the invention.

The teaching according to the invention achieves the advantage that it is possible to provide an apparatus which can be used to determine an accident participant in an improved manner. Another advantage is that the improved determination of the accident participant can be carried out in an automated manner by means of automated evaluation of the recordings made. An accident participant can therefore be determined even when the user of the motor vehicle affected by an accident is currently not locally present at the accident situation.

In another configuration, the apparatus itself has a visual recording apparatus. The apparatus' own recording apparatus is preferably arranged in a pivotable manner.

In another configuration, the apparatus has communication means in order to be able to communicate with a visual recording apparatus in the environment.

The subject matter of a further coordinate claim relates in this case to a motor vehicle having a contact sensor and an apparatus according to the invention. In this case, the contact sensor is set up to detect external contact with the motor vehicle and to forward the detection of this contact to the apparatus according to the invention as corresponding information.

The teaching according to the invention achieves the advantage that it is possible to provide a motor vehicle which can independently determine an accident participant. Another advantage is that the improved determination of the accident participant by the motor vehicle can be carried out in an automated manner by means of automated evaluation of the recordings made. An accident participant can therefore be determined even when the user of the motor vehicle affected by an accident is currently not locally present at the accident situation.

In another configuration, the motor vehicle itself has a visual recording apparatus. The vehicle's own recording apparatus is preferably arranged in a pivotable manner.

In another configuration, the motor vehicle has communication means in order to be able to communicate with a visual recording apparatus in the environment.

The subject matter of a further coordinate claim relates in this case to a computer program product for an apparatus which can be operated according to any method according to the invention.

The teaching according to the invention achieves the advantage that the method can be carried out particularly efficiently in an automated manner.

The subject matter of a further coordinate claim relates in this case to a data storage medium having any computer program product according to the invention.

The teaching according to the invention achieves the advantage that the method can be distributed to or held in the apparatuses, systems and/or motor vehicles carrying out the method in a particularly efficient manner.

Before configurations of the invention are described in more detail below, it should first of all be stated that the invention is not restricted to the described components or the described method steps. Furthermore, the terminology used also does not constitute a restriction, but rather has merely an exemplary character. If the singular is used in the description and the claims, the plural is respectively also included in this case provided that the context does not explicitly exclude this. Any method steps can be carried out in an automated manner provided that the context does not explicitly exclude this. Corresponding method sections can result in corresponding apparatus characteristics and vice versa, with the result that it is possible to change a method characteristic into an apparatus characteristic and vice versa provided that the context does not explicitly exclude this.

Further exemplary configurations of the method according to the invention are explained below.

According to a first exemplary configuration, the method comprises uniquely identifying the accident participant on the basis of the determined identifying characteristic.

Uniquely identifying the accident participant in the sense of the invention means here that the accident participant can be identified at least to the extent that the accident participant can be uniquely identified with a very high degree of probability by virtue of the fact that the identifying characteristic can be compared with features from a corresponding relevant database and the accident participant can be uniquely identified on the basis thereof in the most frequent situations.

In this case, the accident participant can be initially identified by means of automated evaluation of the recorded accident data, for example by means of computational visualistics methods for pattern and/or facial recognition.

This configuration has the advantage that the accident participant can be identified beyond a mere determination of the accident participant.

According to another exemplary configuration, the further method also comprises the fact that the time of the accident is determined only if evaluation of an item of information from the contact sensor reveals that a damaging event has occurred.

A damaging event in the sense of the invention may here be an event which, as a result of contact with the motor vehicle, can result in potential damage to the motor vehicle.

This configuration has the advantage that an accident participant is recorded as required only if damage to the motor vehicle is likely.

According to another exemplary configuration, the further method also comprises the fact that the visual recording apparatus is arranged in and/or on the motor vehicle.

This configuration has the advantage that the motor vehicle is independently enabled to itself visually record accident data.

According to another exemplary configuration, the further method also comprises determining a location of the accident participant. In this case, the environment of the motor vehicle is recorded on the basis of the determined location of the accident participant.

In this case, the accident participant can be determined by determining a spatial position from which the accident involving the motor vehicle took place and by determining a corresponding object at this spatial position, which object can be inferred to be the accident participant.

The operation of determining the accident participant therefore involves selecting, from various captured objects, that object which most likely triggered or made contact with the motor vehicle as the accident participant. Pattern recognition of the recorded accident data can also be used in this case to determine the accident participant in an automated manner.

This configuration has the advantage that the visual recordings can be made in an even more targeted manner.

According to another exemplary configuration, the further method also comprises: checking whether an identifying characteristic can be determined for the location of the determined accident participant, with a direct alignment of the visual recording apparatus with the accident participant, in such a manner that the accident participant can be uniquely identified; if the accident participant cannot be uniquely identified with the direct alignment of the visual recording apparatus with the accident participant: determining a reflection surface which is suitable for reflecting an identifying characteristic of the accident participant in such a manner that it is possible to uniquely identify the accident participant; and aligning the visual recording apparatus with the determined reflection surface.

In this case, the recorded image data can be evaluated by means of pattern recognition in order to detect whether the accident participant can be identified for the location of the determined accident participant with the direct alignment of the visual recording apparatus with the accident participant.

This configuration has the advantage that indirect visual recordings of the accident participant are enabled and can be used to further improve unique identification of the accident participant.

According to another exemplary configuration, the further method also comprises the fact that the visual recording apparatus is arranged in the environment of the motor vehicle.

This configuration has the advantage that, if there is no separate visual recording apparatus, it is nevertheless possible to visually record the accident participant, as a result of which unique identification of the accident participant can be improved further.

According to another exemplary configuration, the method also comprises: determining a visual recording apparatus to be used in such a manner that the location of the accident participant can be visually recorded; and obtaining permission to use the determined visual recording apparatus to be used.

This configuration has the advantage that, if it is not possible to directly visually record the accident participant using a separate visual recording apparatus, it is nevertheless possible to directly visually record the accident participant, as a result of which unique identification of the accident participant can be improved further.

Another advantage is that, if there are a plurality of visual recording apparatuses, it is possible to select that recording apparatus which can best visually record the accident participant.

According to another exemplary configuration, the method also comprises: checking whether an identifying characteristic can be determined for the location of the determined accident participant, with a direct alignment of the visual recording apparatus to be used with the location of the accident participant, in such a manner that the accident participant can be uniquely identified; and, if the accident participant can be uniquely identified with the direct alignment of the visual recording apparatus to be used with the location of the accident participant: aligning the visual recording apparatus to be used with the location of the accident participant.

This configuration has the advantage that a visual recording apparatus in the environment or in a further motor vehicle can be addressed and pivoted in order to also enable direct visual recordings of the accident participant from unfavorable positions of the motor vehicle with respect to the accident participant, which visual recordings can be used to further improve unique identification of the accident participant.

According to another exemplary configuration, if the accident participant cannot be uniquely identified with the direct alignment of the visual recording apparatus to be used with the accident participant, the method comprises: determining a reflection surface which is suitable for reflecting an identifying characteristic of the accident participant in such a manner that it is possible to uniquely identify the accident participant by means of the visual recording apparatus to be used; and aligning the visual recording apparatus to be used with the determined reflection surface.

This configuration has the advantage that a visual recording apparatus in the environment or in a further motor vehicle can be addressed and pivoted in order to also enable indirect visual recordings of the accident participant from unfavorable positions of the motor vehicle with respect to the accident participant, which visual recordings can be used to further improve unique identification of the accident participant.

According to another exemplary configuration, the method also comprises the fact that the operation of recording the environment of the motor vehicle after determining the accident participant comprises tracking the accident participant. In this case, the tracking is based on the determined location of the accident participant.

This configuration has the advantage that moving of the accident participant can be tracked using the visual recording apparatus used in order to enable visual recordings of the accident participant, which visual recordings can be used to further improve unique identification of the accident participant.

The invention therefore allows the provision of a system or an apparatus of a motor vehicle which can independently determine an optimum recording time and, on the basis of this, can generate scheduled recordings using a visual recording apparatus. For this purpose, image recordings which are produced at the time of a collision can first of all be examined for objects involved in the accident. From this time on, these objects are under the control of the system. If a relative movement takes place between such an object—that is to say an accident participant—and the motor vehicle and a more favorable identification constellation also results therefrom, the system makes a recording at the relevant time. As a result of such a system, parked vehicles without occupants can consequently also identify a person/object causing an accident. If the driver of another vehicle as an accident participant commits a hit and run, this driver and/or also the vehicle involved in the accident can therefore be identified with the aid of the invention. However, if the vehicle causing the accident assumes a parked position and the driver of the vehicle involved in the accident and/or the driver of the damaged vehicle do(es) not detect the damage on the spot, the system can help. This is because, according to the invention, the optimum time for recording the situation and therefore for identifying the accident participant can be both during parking and in the driving mode.

Since the traffic situation is recorded in a targeted manner, infringement of data protection guidelines can be avoided since only situation-related image recordings are generated. Nevertheless, the maximum possible information can be obtained since the recordings are carried out or start at the optimum time, namely the time of the accident.

If it is not possible to directly identify the accident participant, this is intended to be carried out, according to the invention, using reflective surfaces to be identified in the environment if an improvement in the recording quality can be achieved thereby or additional object views can be generated thereby. For this purpose, the environment recordings provided by the camera system are searched for suitable reflective surfaces. This can be carried out by means of image processing programs or the suitable surfaces can be identified using knowledge of the surface condition.

Since the recordings are used to evaluate accident scenarios, the recording can be triggered by a registered vibration or acceleration in the vehicle. If the position of the cause of the accident can be determined on the basis of the collision pulse, those surfaces which can provide a mirror image of the relevant object, that is to say the accident participant, can be specifically recorded. For this purpose, the positioning of the relevant objects relative to the vehicle can be tracked. The possible mirror surfaces can make it possible to record particular regions. If a target object is in one of these regions, image recordings thereof are therefore produced.

Furthermore, the resources of another vehicle in the vicinity or resources in the environment can be used. In particular, communication with a corresponding visual recording apparatus in a further motor vehicle and/or in the environment can be initiated and it is possible to enquire whether the corresponding visual recording apparatus makes corresponding recordings and makes them available to the affected motor vehicle.

It can therefore become possible to enable identification of a person/object causing the accident even when the damaged motor vehicle itself would otherwise not have allowed this, for example for environmental reasons or the current position of the motor vehicle with respect to the accident participant.

Generally, computational visualistics methods can be used in this case in order to evaluate the recorded image data by means of pattern recognition and to thus enable and/or support the performance of the method. In this case, the evaluations can also be carried out while recording the accident data, with the result that accident data which have already been recorded can be evaluated while further accident data are recorded.

Furthermore, the practice of recording the environment of the motor vehicle after the determined time of the accident as accident data can mean that the recording is also interrupted in the meantime until new relevant recordings are intended to be made. An example of a scenario for this: a further vehicle was parked parallel to the motor vehicle and the further vehicle bumped into the side of the motor vehicle in the process. The driver of the accident participant gets out of the vehicle after the parking operation, has not noticed the bump and leaves the parking area. The motor vehicle independently determines that its side has been bumped into and begins to record the accident data after the time of the accident. While the accident data continue to be recorded—for example by pivoting the camera to the side on which the motor vehicle was bumped into and, for example, completely recording the accident side during a rotation, the accident data can accordingly already be evaluated during the recording. The evaluation determines the vehicle parked alongside as the accident participant. However, since the accident participant is parked parallel to the motor vehicle, a license plate number cannot be recognized as an identifying characteristic, with the result that it is initially not possible to uniquely identify the accident participant. The vehicle's own camera can now begin a 360° recording of the environment as accident data to be added, for example. The environment of the motor vehicle can also be expanded or restricted to the environment of the accident participant. A further evaluation of the previously available accident data for suitable reflection surfaces can now be carried out. A vehicle exterior mirror of a vehicle which is opposite in the parking lot of the motor vehicle is detected. The camera of the motor vehicle is now pivoted to this reflection surface. In this case, the recording can be continued or else interrupted until the pivoting to the detected vehicle exterior mirror has been concluded. The recording of the image of the vehicle exterior mirror as accident data to be added now follows. These data are evaluated and a license plate number of the accident participant is detected by means of pattern recognition and the accident participant is therefore uniquely identified. This is all carried out in a fully automated manner here using suitable interaction of the method by means of computational visualistics methods to be used for corresponding pattern recognition.

The invention will be explained in more detail below on the basis of the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
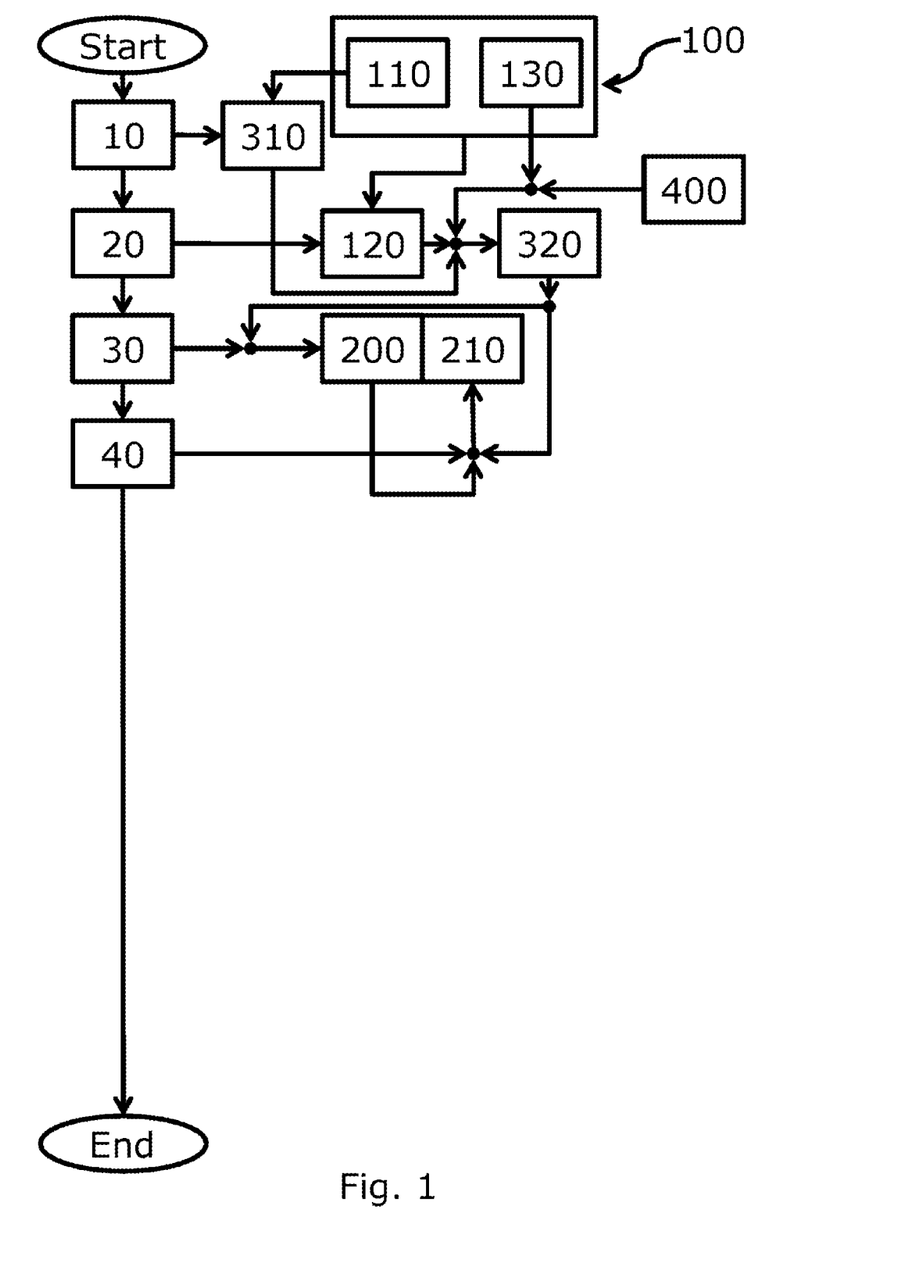
FIG. 1 shows a schematic illustration of a proposed method according to one exemplary configuration of the invention.

FIG. 1 shows a schematic illustration of a proposed method according to one exemplary configuration of the invention.

In this case, FIG. 1 shows a schematic illustration of a method for determining an identifying characteristic 210 of an accident participant 200 in the event of an accident involving the accident participant 200 and a motor vehicle 100. In this case, the method comprises: determining 10 the time of an accident 310, wherein the time of the accident 310 is determined using a contact sensor 110 of the motor vehicle 100; in this case, the contact sensor 110 is set up to detect external contact with the motor vehicle 100; recording 20 an environment 120 of the motor vehicle 100 after the determined time of the accident 310 as accident data 320, wherein the environment 120 is recorded 20 on the basis of recordings from a visual recording apparatus 130, 400; determining 30 the accident participant 200 on the basis of the recorded accident data 320; and determining 40 an identifying characteristic 210 of the accident participant 200 on the basis of the detected accident participant 200 and the recorded accident data 320.

Figure 2:
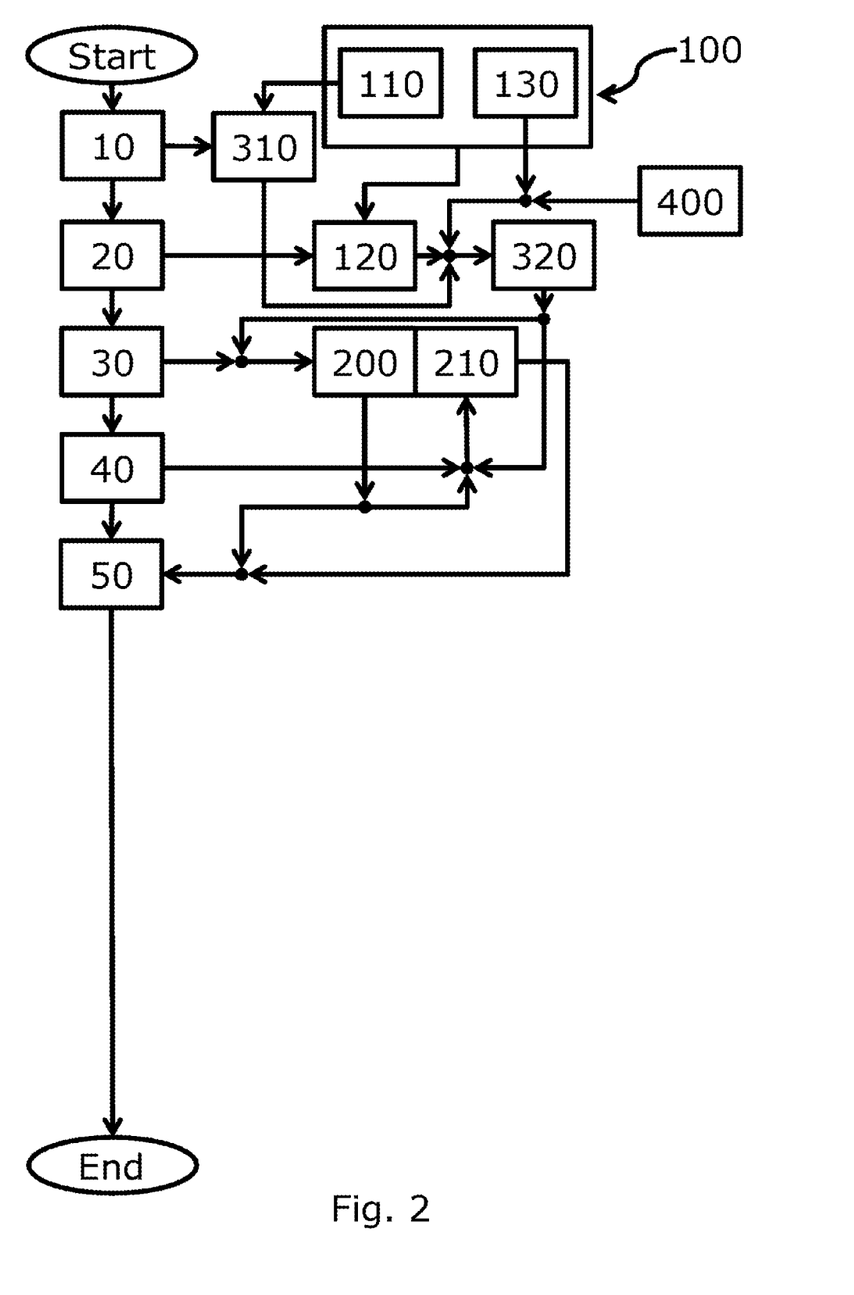
FIG. 2 shows a schematic illustration of a proposed method according to a further exemplary configuration of the invention.

FIG. 2 shows a schematic illustration of a proposed method according to a further exemplary configuration of the invention.

In this case, FIG. 2 shows a schematic illustration of a method which has been developed further with respect to FIG. 1. The statements previously made with respect to FIG. 1 therefore also continue to apply to FIG. 2.

FIG. 2 shows the method from FIG. 1 in which the method also comprises uniquely identifying 50 the accident participant 200. In this case, the unique identification 50 is based on the determined identifying characteristic 210.

Figure 3:
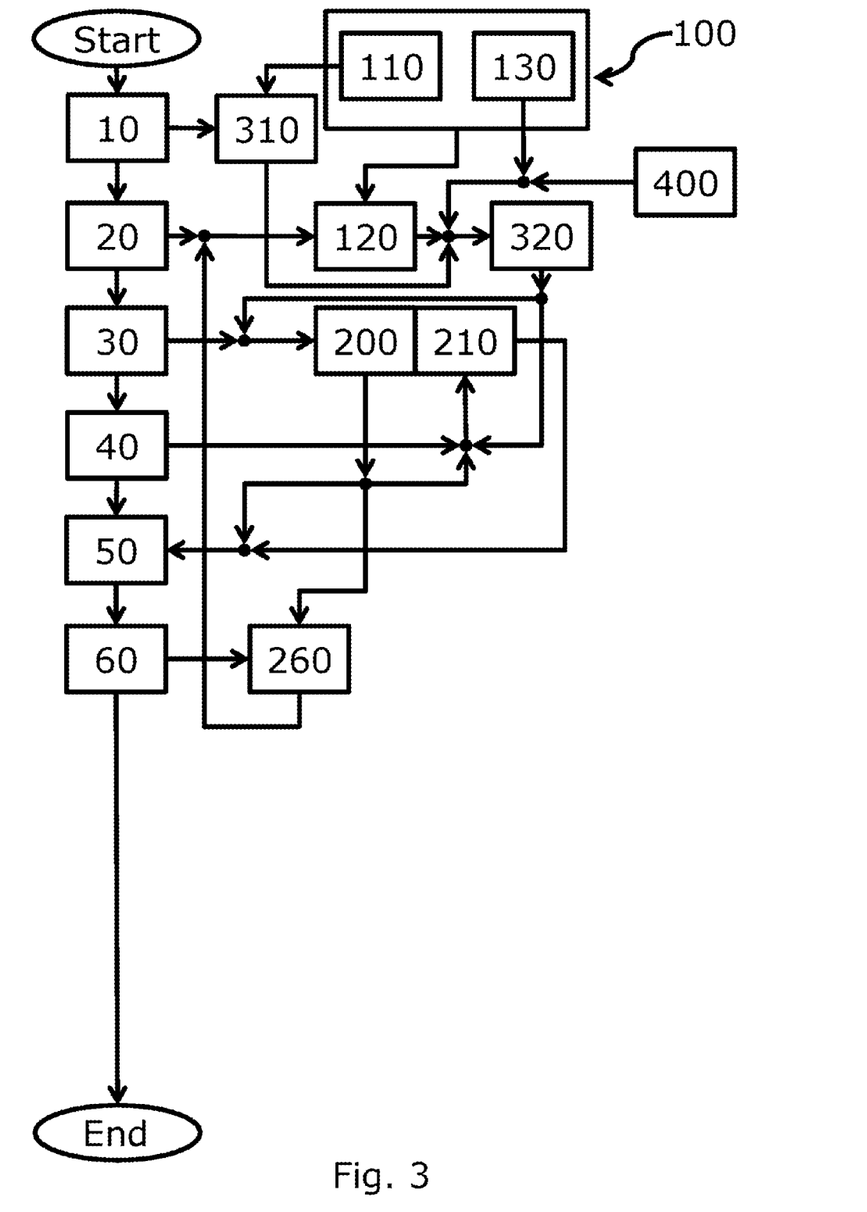
FIG. 3 shows a schematic illustration of a proposed method according to a further exemplary configuration of the invention.

FIG. 3 shows a schematic illustration of the proposed method according to a further exemplary configuration of the invention.

In this case, FIG. 3 shows a schematic illustration of a method which has been developed further with respect to FIG. 1 and FIG. 2. The statements previously made with respect to FIG. 1 and FIG. 2 therefore also continue to apply to FIG. 3.

FIG. 3 shows the method from FIG. 2 in which the method also comprises determining 60 a location 260 of the accident participant 200. In this case, the environment 120 of the motor vehicle 100 is recorded 20 on the basis of the determined location 260 of the accident participant 200.

Figure 4:
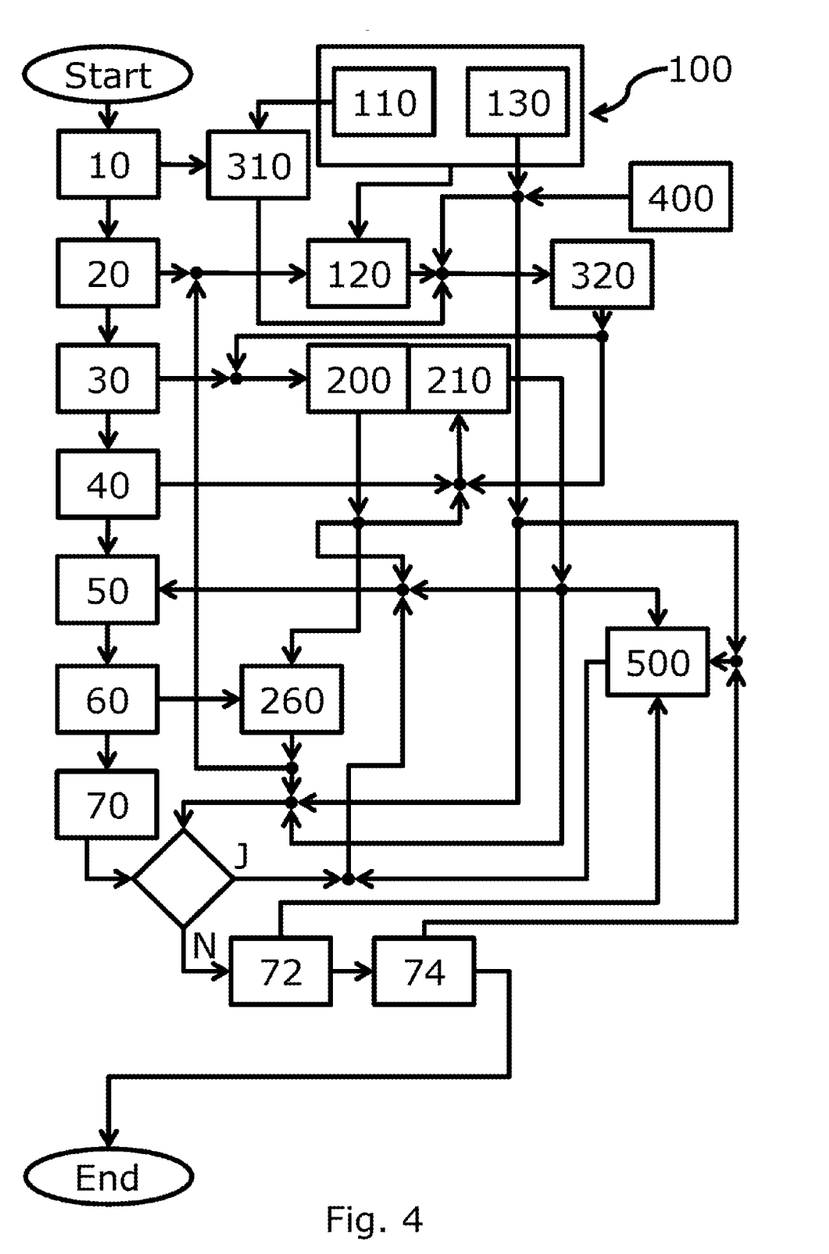
FIG. 4 shows a schematic illustration of a proposed method according to a further exemplary configuration of the invention.

FIG. 4 shows a schematic illustration of the proposed method according to a further exemplary configuration of the invention.

In this case, FIG. 4 shows a schematic illustration of a method which has been developed further with respect to FIGS. 1 to 3. The statements previously made with respect to FIGS. 1 to 3 therefore also continue to apply to FIG. 4.

FIG. 4 shows the method from FIG. 3 in which the method also comprises checking 70 whether an identifying characteristic 210 can be determined for the location 260 of the determined accident participant 200, by means of a direct alignment of the visual recording apparatus 130, 400 with the accident participant 200, in such a manner that the accident participant 200 can be uniquely identified 50. If the accident participant 200 cannot be uniquely identified 50 with the direct alignment of the visual recording apparatus 130, 400 with the accident participant 200, the method also comprises: determining 72 a reflection surface 500 which is suitable for reflecting an identifying characteristic 210 of the accident participant 200 in such a manner that it is possible to uniquely identify 50 the accident participant 200; and aligning 74 the visual recording apparatus 130, 400 with the determined reflection surface 500.

If such a reflection surface 500 cannot be determined, the accident participant 200 cannot be uniquely identified.

Figure 5:
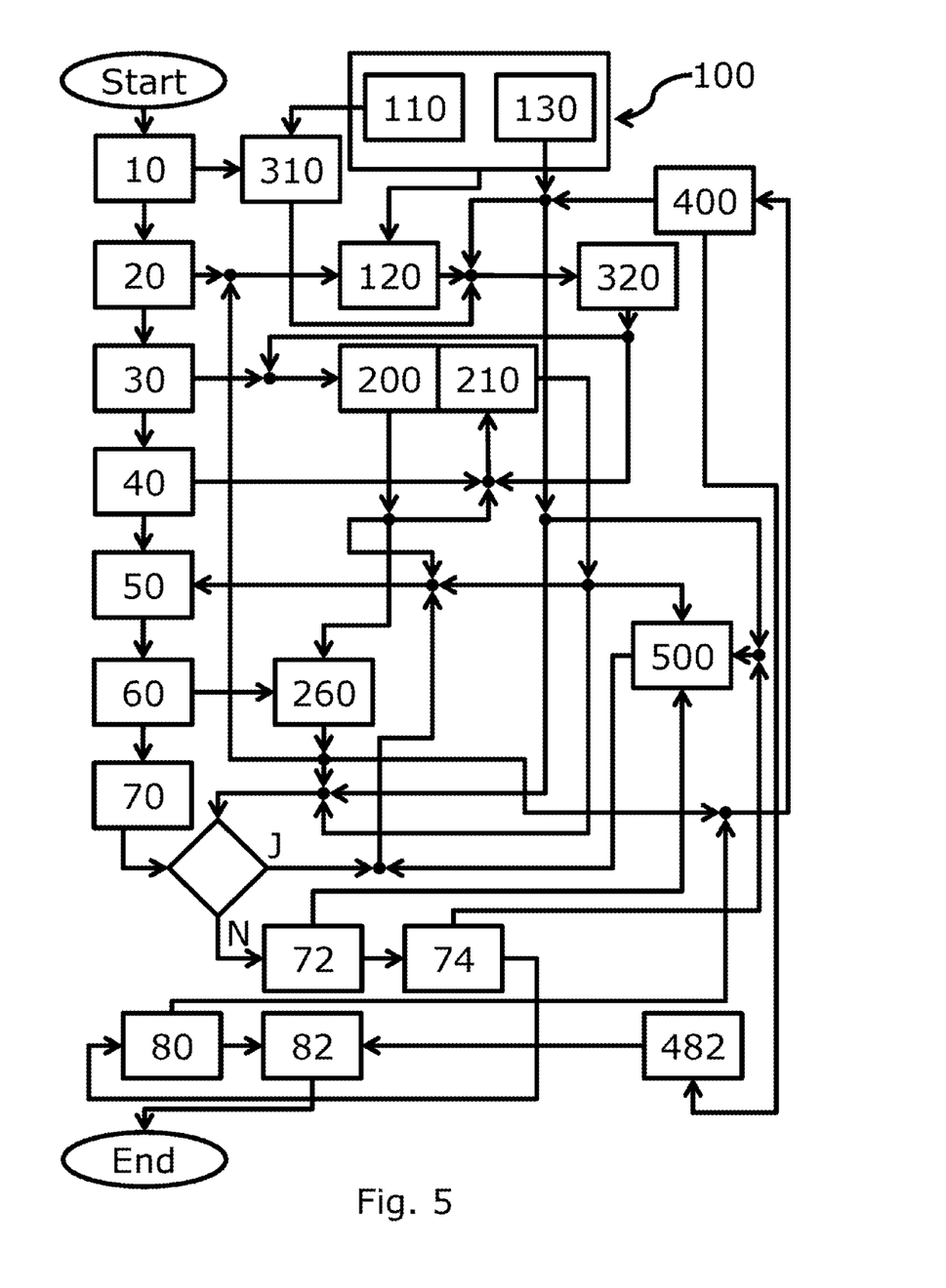
FIG. 5 shows a schematic illustration of a proposed method according to a further exemplary configuration of the invention.

FIG. 5 shows a schematic illustration of the proposed method according to a further exemplary configuration of the invention.

In this case, FIG. 5 shows a schematic illustration of a method which has been developed further with respect to FIGS. 1 to 4. The statements previously made with respect to FIGS. 1 to 4 therefore also continue to apply to FIG. 5.

FIG. 5 shows the method from FIG. 3 in which the method also comprises determining 80 a visual recording apparatus 400 to be used in such a manner that the location 260 of the accident participant 200 can be visually recorded.

The method also comprises obtaining 82 permission 482 to use the determined visual recording apparatus 400 to be used.

Figure 6:
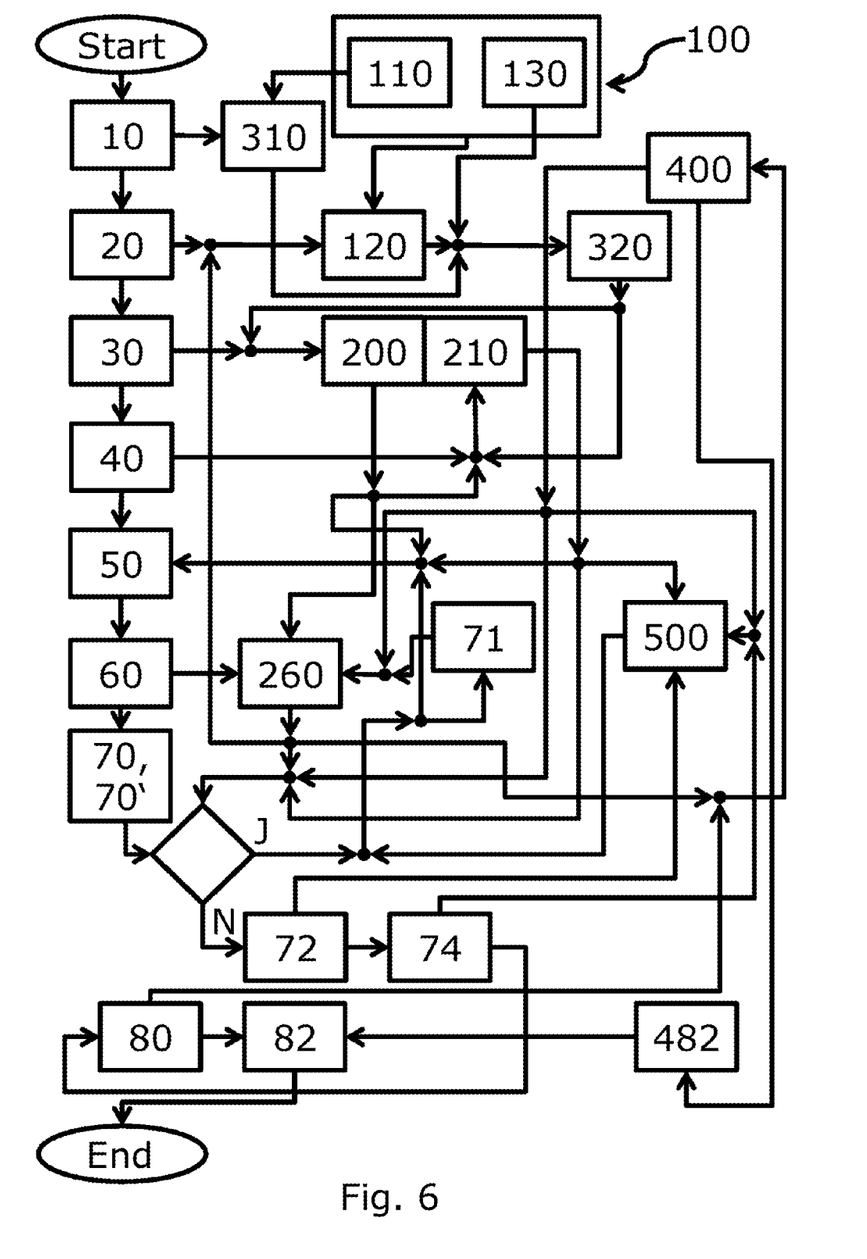
FIG. 6 shows a schematic illustration of a proposed method according to a further exemplary configuration of the invention.

FIG. 6 shows a schematic illustration of the proposed method according to a further exemplary configuration of the invention.

In this case, FIG. 6 shows a schematic illustration of a method which has been developed further with respect to FIGS. 1 to 5. The statements previously made with respect to FIGS. 1 to 5 therefore also continue to apply to FIG. 6.

FIG. 6 shows the method from FIG. 5 in which the method also comprises checking 70' whether an identifying characteristic 210 can be determined for the location 260 of the determined accident participant 200, by means of a direct alignment of the visual recording apparatus 400 to be used with the location 260 of the accident participant 200, in such a manner that the accident participant 200 can be uniquely identified 50. If the accident participant 200 can be uniquely identified 50 with the direct alignment of the visual recording apparatus 400 to be used with the location 260 of the accident participant 200, the method also comprises aligning 71 the visual recording apparatus 400 to be used with the location 260 of the accident participant 200.

Figure 7:
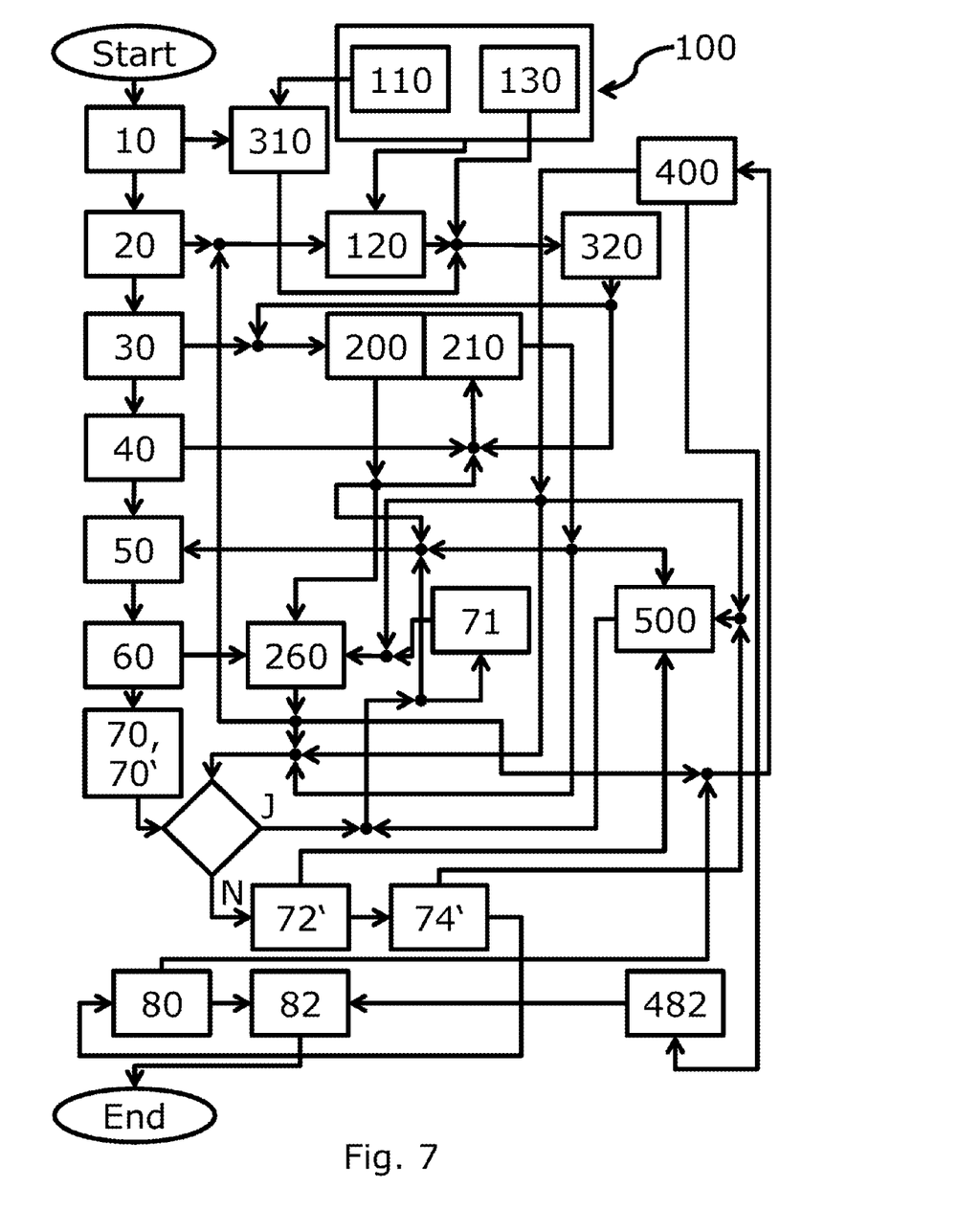
FIG. 7 shows a schematic illustration of a proposed method according to a further exemplary configuration of the invention.

FIG. 7 shows a schematic illustration of the proposed method according to a further exemplary configuration of the invention.

In this case, FIG. 7 shows a schematic illustration of a method which has been developed further with respect to FIGS. 1 to 6. The statements previously made with respect to FIGS. 1 to 6 therefore also continue to apply to FIG. 7.

FIG. 7 shows the method from FIG. 6 in which, if the accident participant 200 cannot be uniquely identified 50 with the direct alignment of the visual recording apparatus 400 to be used with the accident participant 200, the method also comprises: determining 72' a reflection surface 500 which is suitable for reflecting an identifying characteristic 210 of the accident participant 200 in such a manner that it is possible to uniquely identify 50 the accident participant 200 using the visual recording apparatus 400 to be used; and aligning 74' the visual recording apparatus 400 to be used with the determined reflection surface 500.

Figure 8:
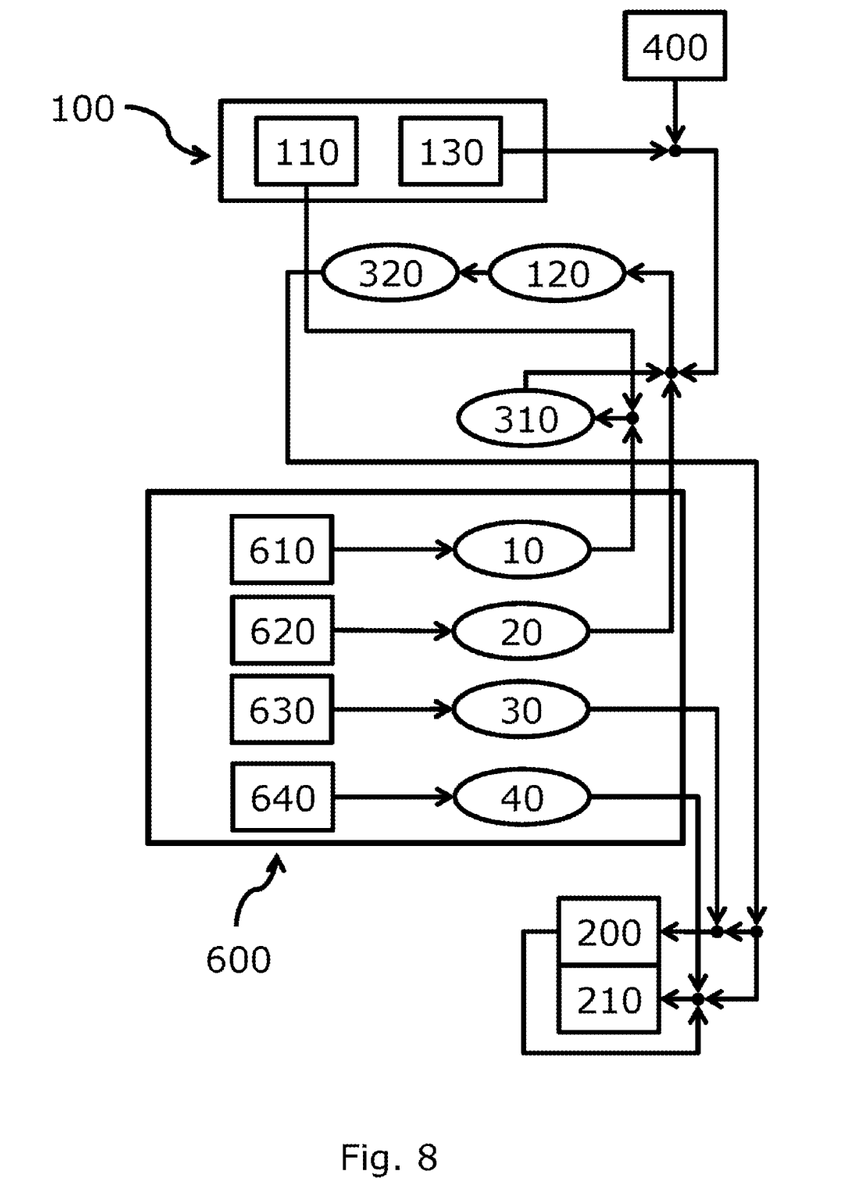
FIG. 8 shows a schematic illustration of a proposed apparatus according to a further exemplary configuration of the invention.

FIG. 8 shows a schematic illustration of a proposed apparatus according to a further exemplary configuration of the invention.

In this case, FIG. 8 shows a schematic illustration of an apparatus 600 for determining an identifying characteristic 210 of an accident participant 200 in the event of an accident involving the accident participant 200 and a motor vehicle 100. In this case, the apparatus 600 has a first determination means 610 for determining 10 the time of an accident 310. In this case, the time of the accident 310 is determined using a contact sensor 110 of the motor vehicle 100. In this case, the contact sensor 110 is set up to detect external contact with the motor vehicle 100. The apparatus 600 also has a recording means 620 for recording 20 an environment 120 of the motor vehicle 100 after the determined time of the accident 310 as accident data 320. In this case, the environment 120 is recorded 20 on the basis of recordings from a visual recording apparatus 130, 400. The apparatus 600 also has: a second determination means 630 for determining 30 the accident participant 200 on the basis of the recorded accident data 320; and a third determination means 640 for determining 40 an identifying characteristic 210 of the accident participant 200 on the basis of the detected accident participant 200 and the recorded accident data 320. In this case, the apparatus 600 is set up to carry out any method according to the invention.

Figure 9:
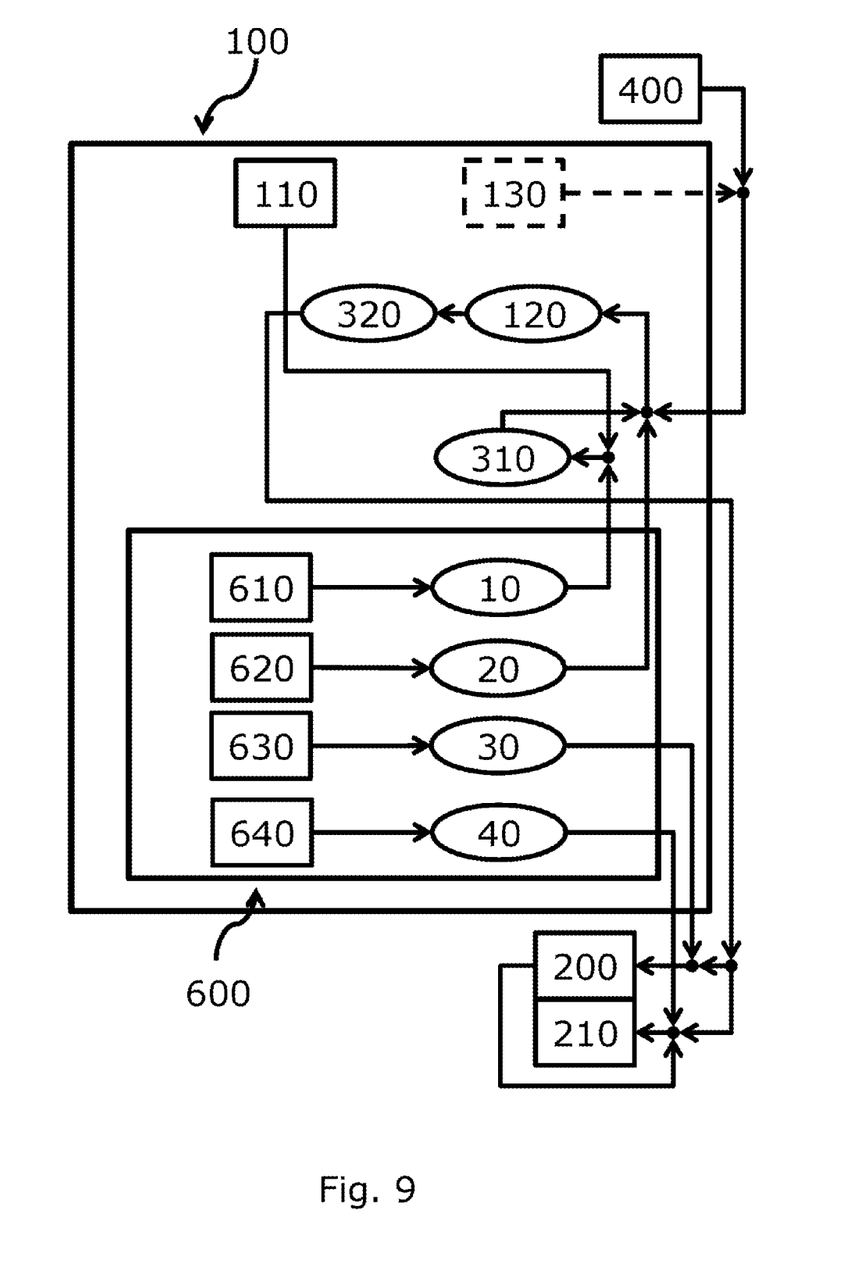
FIG. 9 shows a schematic illustration of a proposed motor vehicle according to a further exemplary configuration of the invention.

FIG. 9 shows a schematic illustration of a proposed motor vehicle according to a further exemplary configuration of the invention.

In this case, FIG. 9 shows a schematic illustration of a motor vehicle 100. The motor vehicle 100 has an apparatus 600 according to the invention and a contact sensor 110. In this case, the contact sensor 110 is set up to detect external contact with the motor vehicle 100.

The motor vehicle 100 may optionally also have a visual recording apparatus 130. This apparatus and its function are therefore illustrated using dashed lines in FIG. 9. If the motor vehicle does not have its own visual recording apparatus 130, a visual recording apparatus 400 in the environment can be used. Both a visual recording apparatus 130 and a visual recording apparatus 400 in the environment can also be used depending on requirements.

The invention can be summarized here as below:

The concept of the invention is to record the vehicle environment as required with the aid of cameras fitted in or on the vehicle and/or with the aid of environment cameras and to detect and uniquely identify the relevant accident participant as far as possible.

For this purpose, an apparatus in the motor vehicle, if an accident involving its own motor vehicle is determined, attempts to determine the accident participant or the local position of the latter and to then make visual recordings which allow the accident participant to be uniquely identified.

If this is not successful, an attempt is made to find out, by means of the visual recordings, whether there are suitable mirror surfaces which can be used for unique identification. If this is also not possible or if a vehicle's own visual recording apparatus is not available, an attempt is made to use a visual recording apparatus in the environment and/or in surrounding motor vehicles to make corresponding recordings and to make them available to the affected motor vehicle so that the accident participant can be uniquely identified using these recordings. In this case, these recordings may likewise be both direct recordings of the accident participant and recordings of suitable mirror surfaces if the latter should be necessary. This makes it possible to identify an accident participant in an improved manner than previously possible.

LIST OF REFERENCE SIGNS

10 Determine the time of the accident
20 Record an environment of the motor vehicle
22 Track the accident participant
30 Determine the accident participant
40 Determine an identifying characteristic
50 Identify the accident participant
60 Determine the location of the accident participant
70 Check whether the accident participant can be uniquely identified with a direct alignment of the visual recording apparatus with the accident participant
70' Check whether the accident participant can be uniquely identified with a direct alignment of the visual recording apparatus to be used with the accident participant
71 Align the visual recording apparatus to be used with the location of the accident participant
72 Determine a reflection surface
72' Determine a reflection surface for the visual recording apparatus to be used
74 Align the visual recording apparatus with the determined reflection surface
74' Align the visual recording apparatus to be used with the reflection surface determined for the visual recording apparatus to be used
80 Determine a visual recording apparatus to be used
82 Obtain permission to use the determined visual recording apparatus to be used
100 Motor vehicle
110 Contact sensor
120 Environment of the motor vehicle
130 Visual recording apparatus of the motor vehicle
200 Accident participant
210 Identifying characteristic
260 Location of the accident participant
310 Time of the accident
320 Accident data
400 Visual recording apparatus to be used in the environment of the motor vehicle
500 Reflection surface
600 Apparatus for determining an identifying characteristic of the accident participant in the event of an accident The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining an identifying characteristic of an accident participant in the event of an accident involving the accident participant and a motor vehicle, the method comprising:
   determining a time of the accident, wherein the time of the accident is determined using a contact sensor of the motor vehicle, and wherein the contact sensor is configured to detect external contact with the motor vehicle;
   recording an environment of the motor vehicle after the determined time of the accident as accident data, wherein the environment is recorded based on recordings
from a visual recording apparatus;
   determining the accident participant based on the recorded accident data;
   determining an identifying characteristic of the accident participant based on the detected accident participant and the recorded accident data;
   checking whether the identifying characteristic can be determined for the location of the determined accident participant, with a direct alignment of the visual recording apparatus with the accident participant, such that the accident participant can be uniquely identified, and
   in response to determining that the accident participant cannot be uniquely identified with the direct alignment of the visual recording apparatus with the accident participant:
      determining a reflection surface which is suitable for reflecting an identifying characteristic of the accident participant such that it is possible to uniquely identify the accident participant, and aligning the visual recording apparatus with the determined reflection surface.

2. The method as claimed in claim 1, wherein the method further comprises:
   uniquely identifying the accident participant based on the determined identifying characteristic.

3. The method as claimed in claim 1, wherein
the time of the accident is determined only if evaluation of an item of information from the contact sensor reveals that a damaging event has occurred.

4. The method as claimed in claim 1, wherein the visual recording apparatus is arranged in and/or on the motor vehicle.

5. The method as claimed in claim 1, the method further comprising:
determining a location of the accident participant, and wherein the environment of the motor vehicle is recorded based on the determined location of the accident participant.

6. The method as claimed in claim 2, the method further comprising:
determining a location of the accident participant, and wherein the environment of the motor vehicle is recorded based on the determined location of the accident participant.

7. The method as claimed in claim 5, wherein
the visual recording apparatus is arranged in the environment of the motor vehicle.

8. The method as claimed in claim 5, wherein
the visual recording apparatus is arranged in the environment of the motor vehicle.

9. The method as claimed in claim 7, the method further comprising:
determining a visual recording apparatus to be used such that the location of the accident participant can be visually recorded; and
obtaining permission to use the determined visual recording apparatus to be used.

10. The method as claimed in claim 8, the method further comprising:
determining a visual recording apparatus to be used such that the location of the accident participant can be visually recorded; and
obtaining permission to use the determined visual recording apparatus to be used.

11. The method as claimed in claim 5, wherein recording the environment of the motor vehicle after determining the accident participant comprises tracking the accident participant based on the determined location of the accident participant.

12. The method as claimed in claim 6, wherein recording the environment of the motor vehicle after determining the accident participant comprises tracking the accident participant based on the determined location of the accident participant.

13. An apparatus for determining an identifying characteristic of an accident participant in the event of an accident involving the accident participant and a motor vehicle, the apparatus comprising:
a first determination means for determining a time of the accident, wherein the time of the accident is determined using a contact sensor of the motor vehicle, and wherein the contact sensor is configured to detect external contact with the motor vehicle;
a recording means for recording an environment of the motor vehicle after the determined time of the accident as accident data, wherein the environment is recorded based on recordings from a visual recording apparatus;
a second determination means for determining the accident participant based on the recorded accident data; and
a third determination means for determining an identifying characteristic of the accident participant based on the detected accident participant and the recorded accident data;
checking whether the identifying characteristic can be determined for the location of the determined accident participant, with a direct alignment of the visual recording means with the accident participant, such that the accident participant can be uniquely identified, and
in response to determining that the accident participant cannot be uniquely identified with the direct alignment of the visual recording means with the accident participant:
determining a reflection surface which is suitable for reflecting an identifying characteristic of the accident participant such that it is possible to uniquely identify the accident participant, and aligning the visual recording means with the determined reflection surface.

14. A motor vehicle comprising:
a contact sensor, wherein the contact sensor is configured to detect external contact with the motor vehicle; and
an apparatus configured to determine an identifying characteristic of an accident participant in the event of an accident involving the accident participant and a motor vehicle, wherein the apparatus comprises:
a first determination means for determining a time of the accident, wherein the time of the accident is determined using the contact sensor of the motor vehicle;
a recording means for recording an environment of the motor vehicle after the determined time of the accident as accident data, wherein the environment is recorded based on recordings from a visual recording apparatus;
a second determination means for determining the accident participant based on the recorded accident data; and
a third determination means for determining an identifying characteristic of the accident participant based on the detected accident participant and the recorded accident data;
checking whether the identifying characteristic can be determined for the location of the determined accident participant, with a direct alignment of the visual recording means with the accident participant, such that the accident participant can be uniquely identified, and
in response to determining that the accident participant cannot be uniquely identified with the direct alignment of the visual recording means with the accident participant:
determining a reflection surface which is suitable for reflecting an identifying characteristic of the accident participant such that it is possible to uniquely identify the accident participant, and aligning the visual recording means with the determined reflection surface.

* * * * *